United States Patent [19]
Singhoff et al.

[11] Patent Number: 5,103,354
[45] Date of Patent: Apr. 7, 1992

[54] MAGNETIC TAPE FOR TESTING AND ADJUSTING MAGNETIC HEADS

[75] Inventors: Werner Singhoff; Johann Dankerl, both of München, Fed. Rep. of Germany

[73] Assignee: BASF-AG, Ludwigshafen, Fed. Rep. of Germany

[21] Appl. No.: 641,623

[22] Filed: Jan. 16, 1991

Related U.S. Application Data

[63] Continuation of Ser. No. 273,956, Nov. 18, 1988, abandoned.

[30] Foreign Application Priority Data

Dec. 5, 1987 [DE] Fed. Rep. of Germany ....... 3741308

[51] Int. Cl.⁵ .................. G11B 21/02; G11B 5/455
[52] U.S. Cl. ......................... 360/75; 360/76; 360/109
[58] Field of Search ............... 360/31, 75, 76, 134, 360/77.01, 77.02, 77.12, 107, 109; 324/207.22-207.24, 210, 212, 227

[56] References Cited

U.S. PATENT DOCUMENTS

| | | | |
|---|---|---|---|
| 2,938,962 | 5/1960 | Konins et al. | 360/76 |
| 4,101,937 | 7/1978 | Jenkins | 360/76 |
| 4,164,764 | 8/1979 | Joannou | 360/77.02 |
| 4,254,440 | 3/1981 | Martin | 360/76 |
| 4,317,144 | 2/1982 | De Niet et al. | 360/76 |
| 4,460,934 | 7/1984 | Yamada | 360/76 |

FOREIGN PATENT DOCUMENTS

| | | |
|---|---|---|
| 1522975 | 10/1969 | Fed. Rep. of Germany. |
| 2314126 | 10/1974 | Fed. Rep. of Germany. |
| 1395717 | 3/1965 | France. |
| 107537 | 8/1974 | German Democratic Rep.. |
| 1398690 | 6/1975 | United Kingdom ........... 360/76 |

OTHER PUBLICATIONS

IEC Publication 94, Part. 6, (Sep. 1987).

*Primary Examiner*—Aristotelis Psitos
*Assistant Examiner*—Steven R. Garland
*Attorney, Agent, or Firm*—Connolly and Hutz

[57] ABSTRACT

A simple and precise method of controlling the gap position (obliqueness and height) of magnetic recording installations with n tracks (n=1, 2 ... ) is obtained by subdividing at least one track of a recording tape into two auxiliary tracks in accordance with the given recording format, which auxiliary tracks are recorded at the center to center track distance of d, using a special head with correct gap position. The recording wave length and magnetization are preferably equal due to the width of the auxiliary tracks being equal. The auxiliary track 1 is recorded continuously while the auxlary track 2 is recorded at time intervals with a signal of equal magnitude but with different phase angles. Each time interval has a phase angle associated with it. The magnitude of correction of the gap required can easily be determined from a graph showing the voltage level difference measured at two different phase positions. The oblique angle of the gap may be measured and corrected by these means and in one variation of the invention the height adjustment of the head can also be measured and corrected.

3 Claims, 3 Drawing Sheets

MAGNETIC TAPE FOR TESTING AND ADJUSTING MAGNETIC HEADS

This application is a continuation of application Ser. No. 07/273,956 filed 11/18/88, now abandoned.

BACKGROUND OF THE INVENTION

This invention relates to a magnetic tape that can be used to test and adjust the alignment of a magnetic head having n gaps for recordings with n-channels or tracks, where n may be 1, 2 ..., and to a process for determining and correcting the oblique angle (skew) of the gap(s) and, therefore, of the magnetic head having the gap(s). The magnetic tape contains parallel recordings of constant wave length and amplitude but differing phase angle.

For scanning small wave lengths in magnetic recording processes, the recording and reproduction gaps of the magnetic heads must be placed parallel to one another as accurately as possible and in general perpendicular to the direction of travel of the tape. Inaccurate adjustment of the gap results in a loss of level in a mono-channel recording and reproduction. In multi-track recordings and reproductions, there is the added problem of a wave-dependent phase difference (see FIG. 1), which may result, for example, in the reproduction level varying with the frequency if reproduction channels are combined to form a single channel (stereo-mono compatability).

Various methods are known for adjusting the gaps of magnetic heads:

An adjustment tape on which short wave lengths are recorded is scanned by the magnetic head which is to be adjusted and the gap position of the head is varied until maximum level is obtained. This generally requires the gap to be turned several times through its optimum position and a correctly adjusted magnetic head must be displaced from its adjustment and readjusted.

DE-PS 1 522 975 discloses a magnetic tape which carries two phase-shifted recordings in two parallel tracks of equal width which are separated from one another. The two tracks carry recordings of constant and small wave lengths whose phase positions race ahead of one another and lag behind one another by the same amount in separate sections. This test tape provides a simple and accurate method of adjusting the gap position for mono records but not multi-track recordings it requires at least two reproduction channels to be connected together or other maneuvers, such as mechanical adjustment of the magnetic gap by trial and error, to be carried out on the apparatus. Other test tapes are also disclosed in DE-AS 2 314 126 and in DD-PS 107 537. The teaching of these specifications also fails to impart a simple method of adjusting the gap of the head for n-channel recordings.

The problem therefore arose of finding a magnetic tape for testing and adjusting the position of the gap, which could carry out this test by means of the voltage level meters present for each channel without interfering with the apparatus itself or its wiring.

SUMMARY OF THE INVENTION

According to our invention, these problems were solved with a method for testing and adjusting alignment of a magnetic head having n gaps each recording one track wherein n=1,2, ... In this process a magnetic tape has at least one track that is subdivided into two auxiliary tracks. A continuous signal is recorded on the first auxiliary track and a signal of the same wavelength is recorded onto the second auxiliary track at cyclic intervals providing a phase shift from the signal recorded onto the first auxiliary track at phase angles of equal magnitude but opposite sign. When the auxiliary tracks are scanned by the magnetic head to be adjusted, the voltage levels at successive time intervals are measured and an angle of obliqueness of the gap can be determined from the voltage level difference between the voltage level measured where the two phase angles are of equal magnitude but opposite sign on the second auxiliary track. The arrangement may also be used to test the height adjustment of the magnetic head.

BRIEF DESCRIPTION OF THE DRAWINGS

The invention will now be described in detail with reference to the drawings, in which.

DESCRIPTION OF THE PREFERRED EMBODIMENTS

1. The influence of the gap position of the reproduction head on the phase displacement angle of two tracks can be described in the following manner.

Figure 1:
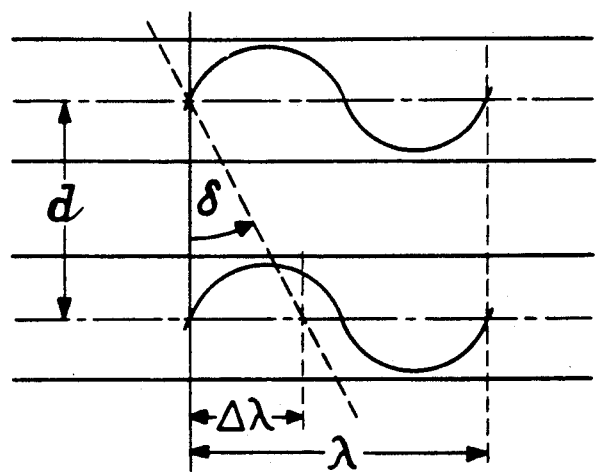
FIG. 1 shows the phase relationship between two tracks.

FIG. 1 shows the phase relationship between two tracks having a center to center distance of d, the recorded wave length $\lambda$, the angle of obliqueness $\delta$ and the local shift $\Delta\lambda$ of the scanning by the reproduction gap in the second track.

When a periodic recording is made, there is a proportionality between $\Delta\lambda$ and the phase displacement angle $\beta$ on the one hand, and the wave length and angle of a period on the other. This relationship (Equation (1)) is derived as follows:

$$\frac{\Delta\lambda}{\beta} = \frac{\lambda}{360°} \rightarrow \Delta\lambda = \frac{\beta \cdot \lambda}{360°}$$

$$\tan\delta = \frac{\beta\lambda}{d \cdot 360°}$$

$$\beta = \frac{360° \cdot d}{\lambda} \cdot \tan\delta$$

Where it is assumed that the angle of obliqueness $\delta$ of the gap is small ($\delta < 30'$), it is sufficiently accurate to replace the tangent of the angle by its radian measure:

$$\delta = \frac{\delta \times 2\pi}{360°}.$$

The phase displacement angle $\beta$ then becomes, as given in Equation (1):

$$\beta = 2\pi\delta \cdot \frac{d}{\lambda}. \quad (1)$$

2. There is a superimposition of reproduction voltages of different phase displacement angles.

Figure 2A:
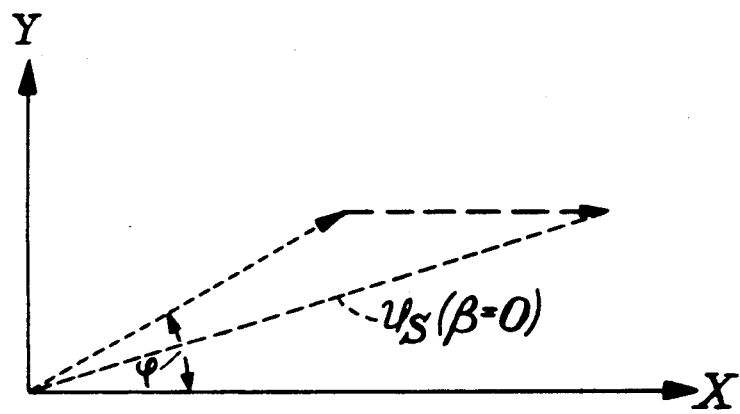
FIG. 2A is the vector diagram of the superimposition $U_s$ of two reproduction voltages where the phase displacement angle $\beta$ is equal to zero.
Figure 2B:
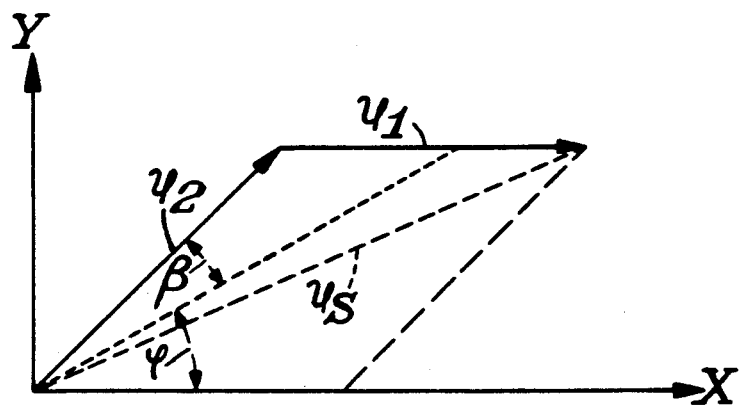
FIG. 2B is the vector diagram of two reproduction voltages $U_1$, $U_2$.

FIG. 2 shows the vector diagram of two reproduction voltages $U_1$, $U_2$ when recordings of equal wave length and magnetization but different phase angles $\phi$ are scanned by a reproduction head, which as a result of its oblique angular position produces an additional phase displacement angle $\beta$.

The total voltage due to superimposition $U_s$ is generally given by the following equation:

$$U_s = \sqrt{(U_{x1} + U_{x2})^2 + (U_{y1} + U_{y2})^2}.$$

If the voltage $U_1$ of the track 1 is given the phase reference $\phi_1 = 0$, then:

$$\begin{aligned} U_{x1} &= U_1 \\ U_{y1} &= 0 \end{aligned} \text{ and } \begin{aligned} U_{x2} &= U_2 \cdot \cos(\phi + \beta) \\ U_{y2} &= U_2 \cdot \sin(\phi + \beta) \end{aligned}$$

Since the magnetization in the tracks is assumed to be equal, $U_1$ and $U_2$ are also equal.

The total voltage then becomes:

$$U_s = U\sqrt{[1 + \cos(\phi + \beta)]^2 + \sin^2(\phi + \beta)}.$$

or in simplified form, as set out in Equation (2):

$$U_s = U\sqrt{2} \cdot \sqrt{1 + \cos(\phi + \beta)}. \quad (2)$$

When Equation (1) is substituted in Equation (2) one obtains the following relationship of Equation (3):

$$U_s = U\sqrt{2} \cdot \sqrt{1 + \cos\left(\phi + 2\pi\delta\frac{d}{\lambda}\right)}. \quad (3)$$

If one considers the special case of $\phi$ and $\beta$ both equal to 0, then:

$$U_{so} = 2U.$$

This value $U_{so}$ is suitable as reference voltage for determining the voltage loss as a level drop $\Delta P$ when $\phi$ and $\beta \neq 0$. The relationship is represented in Equation (4) which is derived in the following manner:

$$\begin{aligned} \Delta P &= 20 \cdot \log \frac{U_s}{U_{so}} \\ &= 20 \log \frac{U\sqrt{2} \cdot \sqrt{1 + \cos\left(\phi + 2\pi\delta\frac{d}{\lambda}\right)}}{2U} \\ \Delta P &= 20 \log\left(\tfrac{1}{2}\sqrt{2} \cdot \sqrt{1 + \cos\left(\phi + 2\pi\delta\frac{d}{\lambda}\right)}\right). \end{aligned} \quad (4)$$

Figure 3A:
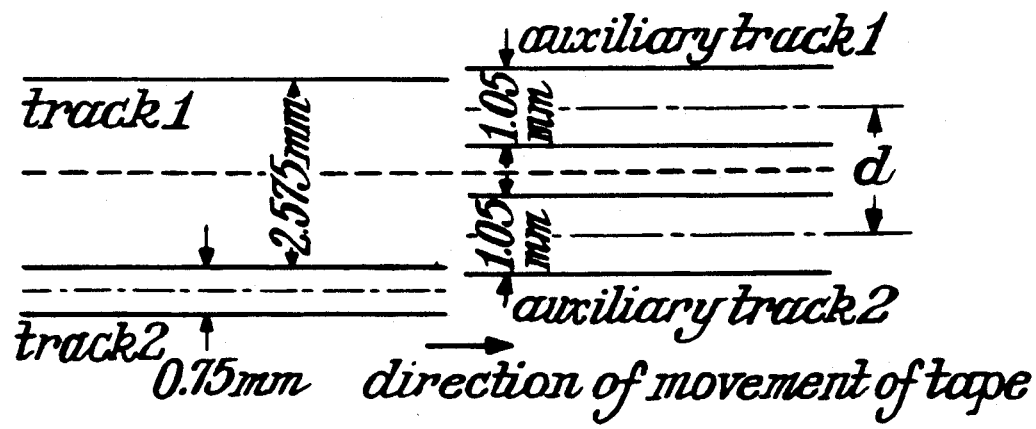
FIG. 3A illustrates an embodiment according to the invention of a magnetic tape for adjusting and testing the direction of the magnetic head.

3. The test tape for testing the gap position according to the present invention can be recorded on a commercially available magnetic tape as follows:

At least one track according to the given recording format (for example as laid down in IEC Publication 94, part 6) is subdivided into two auxiliary tracks as shown in FIG. 3. These auxiliary tracks are recorded at a center to center track distance of d and with a special magnetic head with the correct gap position. The recording wave length $\lambda$ and magnetization are the same in both tracks, preferably due to equal widths of the auxiliary tracks.

Figure 3B:
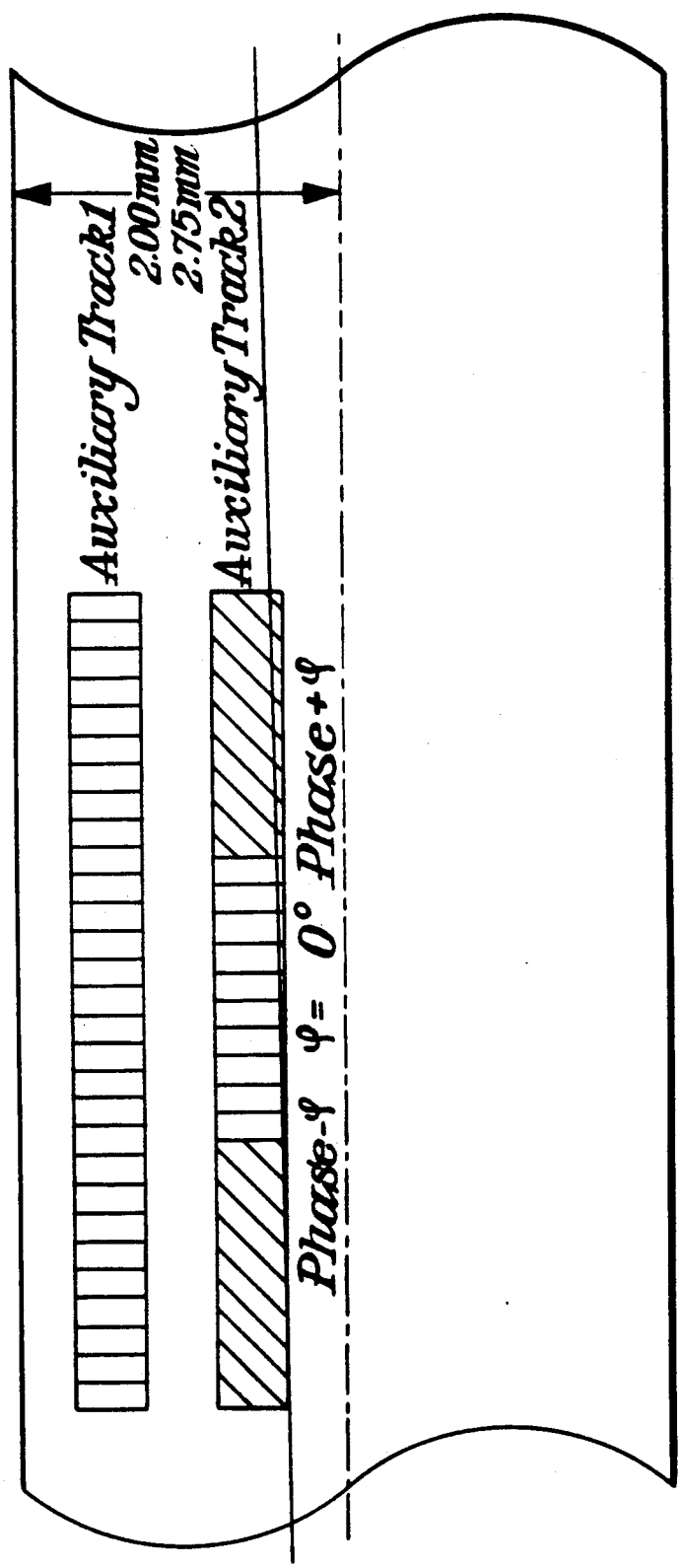
FIG. 3B shows the phase relationship of the signals recorded on auxiliary tracks 1 and 2.

As shown in FIG. 3B, the auxiliary track 1 is recorded continuously. The auxiliary track 2 is recorded intermittently at time intervals but with different phase angles. Each time interval has a phase angle associated with it.

The phase angle $\phi = 0°$ at a time $t_0$ may, for example, be followed by a phase angle $\phi = \phi_1$ at time $t_1$ which in turn is followed by $\phi = -\phi_1$ at time $t_2$. The phase angle $\phi$ may assume any values except 0°, 180° and 360° and preferably has a value from 90° to 160°.

The track, which has two auxiliary tracks as is clear from the previous paragraph, is now scanned with the magnetic head gap to be tested, and the levels obtained at the times $t_0$, $t_1$ and $t_2$ are measured with a conventional voltage level meter associated with this track. When scanning is carried out with the correct gap position, i.e., when $\delta = 0$, a reference level is obtained as well as two lower level values for $\phi = +\phi_1$ and $\phi = -\phi_1$, which are equal to one another.

When the gap is positioned obliquely (e.g., skewed) at an angle $\delta \neq 0$, then the level drops $\Delta P\phi_1$ and $\Delta P\phi_2$ are not equal. The angle of obliqueness of the gap can be calculated from the difference between the two level values at the times $t_1$ and $t_2$ by means of the following equation(s):

$$\Delta\Delta P = 20 \log\left(\tfrac{1}{2}\sqrt{2}\sqrt{1 + \cos\left(\phi + \frac{2\pi\delta d}{\lambda}\right)}\right) - 20 \log\left(\tfrac{1}{2}\sqrt{2}\sqrt{1 + \cos\left(\frac{2\pi\delta d}{\lambda} - \phi\right)}\right).$$

which can be simplified to Equation (5):

$$\Delta\Delta P = 10 \log \frac{1 + \cos\left(\phi + \frac{2\pi\delta d}{\lambda}\right)}{1 + \cos\left(\frac{2\pi\delta d}{\lambda} - \phi\right)}. \quad (5)$$

The arrangement may also be used to test the height adjustment of the head gap. For this purpose, recordings of equal phase may be carried out in the two auxiliary tracks, only one auxiliary track being recorded during the time interval $t_1$, the other auxiliary track in the time interval $t_2$ and both auxiliary tracks in $t_3$. If the head is at the correct height, then the total voltage $U_s$ at the time $t_3$ must be equal to 2U, i.e., the sum of the voltages U at the time intervals $t_1$ and $t_2$. Another possibility for correcting the height adjustment of the head consists of shifting the n tracks by a predetermined amount outside the given reproduction track. A third possibility consists of supplying a nominal level value for $t_0$ with the test tape, in other words recording equal phases in the auxiliary tracks 1 and 2. If the level measured is still too low after the angular position of the gap has been adjusted, then the fault is due to incorrect height of the head.

4. Example 1 illustrates one practical application of the present invention.

EXAMPLE 1

The recordings described in section 3 were made on a test and adjustment tape of width 6.25 mm. FIG. 3 shows the positions of the two auxiliary tracks 1.05 mm in width of a standard 4 track head with a center to center track distance of 1.7 mm within a stereo track. The auxiliary tracks were recorded with wave length $\lambda = 23.8$ μm (corresponding to a frequency of 16 kHz) at a recording speed of 38.1 cm/s and a magnetization flux of 210 nWb/m for each auxiliary track. Each of the three phase positions was recorded for one second on auxiliary track 2. This test tape was used to determine the gap position of the reproduction head of a commercially obtainable ¼" stereo reproduction apparatus (according to IEC Publication 94-6).

Figure 4:
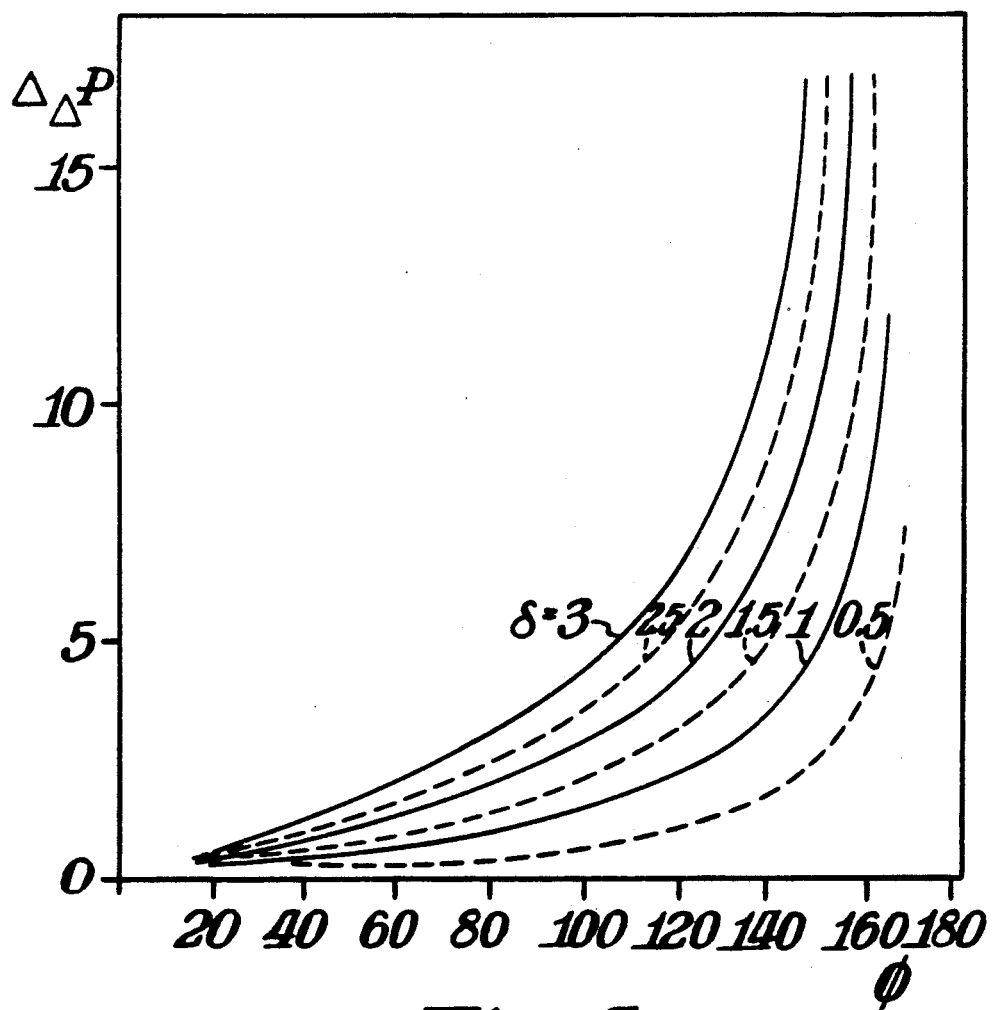
FIG. 4 represents the level asymmetry as a function of the phase angle $+\phi$ and $-\phi$.

When the values given above are substituted in equation (5) (section 3) the angle of obliqueness $\delta$ of the gap can be calculated from the level difference measured at times $t_1$ and $t_2$. The graphs of FIG. 4 represent the voltage level asymmetry $\Delta\Delta P$ as a function of the phase angles $+\phi$ and $-\phi$, using the obliqueness $\delta$ of the gap as parameter. This enables the angle of obliqueness of the gap which requires correction to be easily determined so that the required adjustment can then be made.

We claim:

1. A method for testing and adjusting alignment of a magnetic head having n gaps each recording one track wherein n = 1, 2, ..., comprising:

subdividing at least one track of a magnetic tape into two auxiliary tracks, separated from one another by a certain center to center distance; recording at cyclic intervals a signal onto the first auxiliary track;

recording onto the second auxiliary track signals of the same wavelength as the signal recorded onto the first auxiliary track but in a sequence at cyclic intervals so that at one time interval only the signal on the first auxiliary track has been recorded and at a second time interval only a signal on the second auxiliary track is recorded and at a third time interval signals have been recorded on the first and on the second auxiliary tracks;

measuring voltage levels at the three successive time intervals when the auxiliary tracks are scanned together by the magnetic head so that the total voltage level measured at the third time interval can be compared to the sum of the voltage levels measured at the first and second time intervals; and adjusting the height of the magnetic head so that the voltage level measured at the third time interval is equal to the sum of the voltage levels measured at the first and second time intervals.

2. A method for testing and adjusting alignment of a magnetic head having n gaps each recording one track, wherein n = 1, 2, ..., comprising:

subdividing at least one track of a magnetic tape into two auxiliary tracks, separated from one another by a certain center to center distance;

recording a continuous signal onto the first auxiliary track;

recording onto the second auxiliary track in a sequence at cyclic intervals signals of the same wavelength as the signal recorded onto the first auxiliary track but with the signal recorded onto a first section of the second auxiliary track in phase with the signal recorded on the first auxiliary track and the signal recorded onto a second section of the second auxiliary track shifted in phase from the signal recorded on the first auxiliary track with a phase shift accomplished with a phase angle of between 90° to 160° and the signal recorded onto a third section of the second auxiliary track shifted in phase from the signal recorded on the first auxiliary track and with a phase shift accomplished with a phase angle of equal magnitude but opposite sign to the phase angle of the signal recorded on the second section of the second auxiliary track;

measuring voltage levels at successive time intervals when the auxiliary tracks are scanned together by the magnetic head so that the angle of obliqueness of the gaps can be determined from the voltage level differences between the voltage levels measured at the second and third section intervals for any angle of obliqueness less than 30'; calculating the angle of obliqueness of the gap of the magnetic head according to the following equation:

$$\Delta\Delta P = 10 \log \frac{1 + \cos\left(\phi + \frac{2\pi\delta d}{\lambda}\right)}{1 - \cos\left(\frac{2\pi\delta d}{\lambda} - \phi\right)}$$

wherein $\Delta\Delta P$ = voltage level difference
  $\phi$ = phase angle
  $\delta$ = angle of obliqueness
  $\lambda$ = recording wavelength of signal on the auxiliary tracks
  d = center to center distance between the auxiliary tracks; and adjusting the alignment of the magnetic head so that the angle of obliqueness is zero.

3. A method for testing and adjusting alignment of a magnetic head having n gaps each recording one track, wherein n = 1, 2, ..., comprising:

subdividing at least one track of a magnetic tape into two auxiliary tracks, separated from one another by a certain center-to-center distance;

recording a continuous signal onto the first auxiliary track;

recording onto the second auxiliary track in a sequence at cyclic intervals signals of the same wavelength as the signal recorded onto the first auxiliary track, but the signals recorded are shifted in phase from the signal recorded on the first auxiliary track in at least two of the cyclic intervals on the second auxiliary track, with the phase shifts accomplished with two phase angles being of equal magnitude but opposite sign;

measuring voltage levels when the auxiliary tracks are scanned together by the magnetic head, the voltage level measurements being made at successive time intervals corresponding to the recorded sequence for the second auxiliary track so that an angle of obliqueness of the magnetic head can be determined from the voltage level difference between the voltage levels measured at the two intervals where the phase angles of the signals recorded on the second auxiliary track are of equal magnitude but opposite sign;

calculating the angle of obliqueness of the magnetic head;

adjusting the alignment of the magnetic head so that the angle of obliqueness is zero;

recording onto the second auxiliary track in the sequence during one of the cyclic intervals a signal of the same wavelength and with the same phase angle of the signal recorded onto the first auxiliary track;

measuring the voltage level when the auxiliary tracks are scanned together by the magnetic head at the time interval corresponding to the interval on the second auxiliary track where the signal thereon recorded has the same wavelength and is in phase with the signal recorded on the first auxiliary track; and adjusting the height of the magnetic head by comparing the voltage level measured at said time interval corresponding to the interval on the second auxiliary track where the signal thereon recorded has the same wavelength and is in phase with the signal recorded on the first auxiliary track with a nominal voltage level.

* * * * *